United States Patent [19]

Flack

[11] 3,850,014
[45] Nov. 26, 1974

[54] ANTI-SHATTER PADLOCK SHACKLE, AND PROCESS
[75] Inventor: Max L. Flack, Indianapolis, Ind.
[73] Assignee: Best Lock Corporation, Indianapolis, Ind.
[22] Filed: Apr. 9, 1973
[21] Appl. No.: 349,115

[52] U.S. Cl. ............... 70/53, 70/417, 148/1 C, 148/39
[51] Int. Cl. ............... E05b 15/16, E05b 67/06
[58] Field of Search ............ 70/53, 417, 51; 148/39, 148/16

[56] References Cited
UNITED STATES PATENTS

| | | | |
|---|---|---|---|
| 2,435,946 | 2/1948 | Robiette | 148/39 X |
| 3,152,020 | 10/1964 | Gross | 148/39 X |
| 3,406,047 | 10/1968 | Magor | 148/39 X |
| 3,421,951 | 1/1969 | Shelton | 148/39 |
| 3,560,272 | 2/1971 | Yamazaki | 148/39 X |
| 3,713,309 | 1/1973 | Miller | 70/38 A |

Primary Examiner—Robert L. Wolfe
Attorney, Agent, or Firm—Trask, Jenkins & Hanley

[57] ABSTRACT

A padlock shackle or other locking bar hard enough to resist cutting with a hack saw and strong enough to resist cutting with a bolt cutter is made of a high carbon steel composition hardened substantially throughout its section to a hardness at least equal to that of hack saw hardness (Rockwell C–53) and is given high resistance to shatter under impact or stress, especially when chilled, by subjecting the steel stock to decarburizing conditions which substantially reduce the carbon content at the surface of the shackle. This produces on the shackle, after final hardening heat treatment, a surface layer having substantially reduced hardness, e.g. Rockwell C–45–47, and substantially increased ductility at and near the surface and progressively increasing hardness inward to the full hardness and strength of the steel composition at a depth of not more than 0.035 inch. The decarburized and more ductile surface greatly increases resistance of the shackle to shattering under impact and stress, while leaving the core with full strength and resistance to cutting.

7 Claims, 3 Drawing Figures

PATENTED NOV 26 1974 3,850,014

ANTI-SHATTER PADLOCK SHACKLE, AND PROCESS

BACKGROUND OF THE INVENTION

Padlocks for high security applications require shackles which are sufficiently hard to resist cutting with a hack saw and which have sufficient hardness and strength to resist cutting with bolt cutters. Hack saw blades normally have a Rockwell hardness of C–53 and bolt cutters a hardness of C–50 to C–52. Shackles can be given high resistance to cutting with hack saws and with bolt cutters by making them of hardened steel compositions containing a high carbon content, as in the range of 0.8 percent and higher, which are hardenable throughout to a hardness greater than hack saw hardness, preferably to a Rockwell hardness of C–55 or more.

In the manufacture of padlock shackles, however, such high hardness causes serious problems and high scrap loss. In such manufacture it is necessary to bend the shackles to their generally U-shape or J-shape and do necessary machining while the shackle stock is in annealed state, and then to heat treat the formed and machined products to develope the desired strength. Such heat treatment tends to cause warping and change of dimensions of the semi-finished shackles and it is usually necessary to bend the hardened shackles slightly after hardening to adjust them for assembly with a proper fit of the legs of the shackle in their holes in the padlock housing. It has been found by experience that when the shackles are of a high carbon composition necessary to give the desired hardness, the necessary bending adjustment in assembly causes the shackles to shatter. This produces high scrap loses which have been found to range upward to 35 percent and more. Any tendency of the shackle to shatter is also a serious defect in the finished padlock. Not only may the shackle shatter in ordinary handling and use, but is is especially vulnerable to forced entry attack with the use of any hammer or tool which stresses the shackle. This is especially important in view of certain recently developed methods of forced entry attack in which the shackle or the padlock as a whole is chilled with refrigerant liquid such as Freon which boils at −25° F. or with dry ice, which sublimes at −110° F., and then striking the chilled shackle a sharp blow with a hammer.

The tendency to shatter is especially critical in shackles of smaller cross section, for example ⅜ inch diameter and smaller, because it is found that even when these are of a composition hard enough to resist direct cutting by bolt cutters, the stress imposed by bolt cutters will often cause such small-size shackles to shatter, sometimes at points remote from the point of application of the bolt cutter. While this shatter tendency under stress is not fully understood, nevertheless it increases the importance of the shackle resistance produced by the present invention.

The present invention provides shackles which have the desired high carbon content and high hardness but which are highly resistant to shatter. The invention is also applicable to other locking bars, such as lock bolts, hasp members, and the like, but is described below in relation to padlock shackles.

In accordance with the present invention as applied to a padlock shackle, such shackle is made of bar stock of a steel composition which contains a high carbon content and which can be hardened throughout its section by suitable heat treatment so as to give high hardness and strength. The steel stock during the course of manufacture of the stock and the shackle is subjected to surface decarburization conditions which reduce the carbon content at the surface of the stock sufficiently to produce at that surface a composition which after final heat treatment will have a substantially reduced hardness and brittleness and a substantially increased ductility in comparison with the composition of the main body or core of that stock. The extent of carbon reduction will be progressively less at increasing distances inward from the surface, so that hardness will progressively increase and ductility progressively decrease in a gradient from the surface inward to the unmodified core portion of the stock containing the relatively higher full carbon content of the composition.

The decarburization can be obtained in various ways and at various stages in the process. Commonly, the hot rolling which is used to produce bar stock of high carbon steel also produces an oxidation and decarburization at the surface of the stock, but this is removed as part of the production process, as by grinding, before the stock is delivered by the producer. At least part of the decarburization desired for the present invention may be obtained by utilizing the hot-rolled stock material without removing its oxidized and decarburized surface layer. Additional decarburization may be obtained during subsequent heat treatment steps at any desired time in the manufacturing process. Desirably, the additional decarburizing is obtained in the final hardening heat treatment of the formed and machined shackle, by carrying out such heat treatment in an oxidizing or decarburizing atmosphere. Decarburization after machining extends the reduced-carbon condition to at least some extent to the machined surfaces. This is desirable even though such surfaces are concealed and protected in use, but is less important than the presence of the reduced-carbon condition on the exposed locking portion of the locking bar or shackle.

The invention may be applied to any of various hardenable steel compositions in which the hardness depends on the carbon content of the composition and which can be hardened throughout by suitable heat treatment. These include especially the so called high carbon steels and alloy steels containing a nomimal 1.0 percent or more of carbon, with carbon in the range of from 0.8 percent upward to say 1.5 percent or more. The particular steel used may be selected in accordance with usual criteria and should be selected to give sufficient hardness without excess brittleness and with sufficient ductility to permit the necessary manufacturing and assembly operations. The invention permits the use of higher carbon contents and harder structure than would otherwise be possible.

In order to minimize distortion of formed shackles in subsequent heat treatment, the steel used is desirably an air hardening steel. Good results have been obtained with Grade A–2 tool steel of the American Iron and Steel Institute, having a nominal composition containing 1.0 percent carbon, 5.00 percent chromium and 1.00 percent molybdenum.

The essence of the invention is the provision in a shackle or other locking bar, particularly, in the exposed locking portion thereof, of a steel composition of relatively high carbon content on the inside of the bar and a relatively low carbon content in a thin surface portion of the bar. With these relative carbon contents, the bar is heat treated to provide high hardness in the high carbon portion of the bar and high ductility with lower hardness at the surface. This imparts greatly increased shatter resistance to the hardened bar.

The invention is not confined to use with so-called high-carbon steels, but may be used with steel compositions of intermediate and medium carbon content, as for example where it is desired to improve resistance to shatter when chilled of lower-carbon steel compositions. Thus, for example, the steels which may be used include hardenable grades of medium carbon and alloy steels containing 0.4 percent and more carbon.

The amount of decarburizing may vary. In a high carbon steel bar which will harden to Rockwell C–53 or more, the decarburization preferably reduces the carbon content at the surface sufficiently to give a Rockwell hardness at such surface of the finally heat treated shackle of less than about C–47. The depth of decarburization may vary considerably, and is preferably at least 0.005 inch and not more than 0.035 inch. Deeper surface decarburization is not necessary to shatter resistance and both reduces the cross section of the core and requires longer decarburization which is uneconomic. The main body or core of the steel stOck remains with the full carbon content and hardenability of the steel composition used.

BRIEF DESCRIPTION OF THE DRAWINGS

The accompanying drawing illustrates the invention. In such drawing.

DETAILED DESCRIPTION OF THE PREFERRED EMBODIMENT

Figure 1:
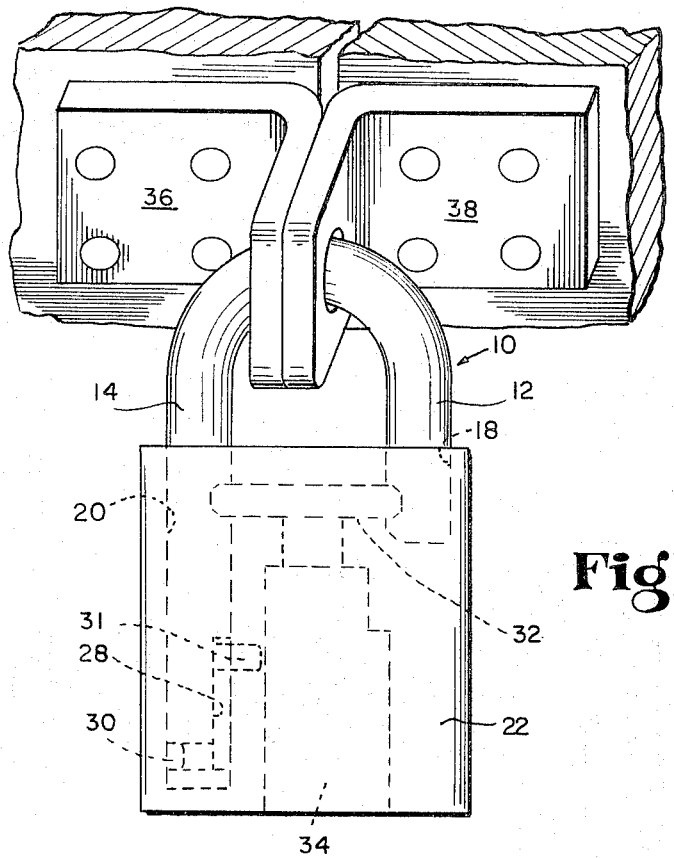
FIG. 1 shows a padlock having a shackle in accordance with the invention, secured to a pair of locking bars which may also be made in accordance with the invention.

The padlock shown in the drawing comprises a shackle 10 bent from bar stock to a generally J-shaped configuration with a short leg 12 and a long leg 14 interconnected by a bent section 16 which forms a locking portion exposed outside the padlock housing or case 22. The leg 14 is sometimes referred to as the heel and the leg 12 as the toe of the shackle. The legs 12 and 14 are substantially parallel, and are received in parallel holes 18 and 20 of the padlock case 22. The toe end 12 of the shackle has a notch 24 machined therein to receive a locking bolt. The heel 14 has both a similar notch 24 to receive a bolt and has an elongated flat notch 28 to receive a shackle retainer 31 and has an annular groove 30 at the lower end of the notch 28 to clear the retainer and permit the shackle to rotate on the axis of the leg 14 when the shackle is withdrawn to its limit from the case 22. When the shackle is locked in the case, the notches 24 in the legs are engaged by a retainer bolt 32 to hold the shackle 10 in place in the case, and this is controlled by a key actuated mechanism of a lock core 34 mounted in the case. The key locking mechanism and the bolt mechanism may be of any desired type in accordance with conventional practice.

The padlock as engaged through the eyes of a pair of locking bars 36 and 38 respectively secured to a door and a door jamb, and serves to lock those bars together and hence to secure the door to the jamb. The locking bars may be made of steel with a relatively high carbon content on the inside and a relatively low carbon content on the outside, to give them shatter resistance in accordance with the invention.

The shackle 10 is made as follows. The stock material used is bar stock of A–2 tool steel of a composition having the following analysis:

| Component | Nominal Proportion | Analysis Proportion |
| --- | --- | --- |
| Carbon | 1.0% | 0.985% |
| Manganese | | 0.45% |
| Phosphorous | | 0.018% |
| Sulfur | | 0.12% |
| Silicon | | 0.26% |
| Chromium | 5.% | 5.42% |
| Molybdenum | 1.0% | 1.02% |
| Tungsten | | 0.02% |
| Vanadium | | 0.23% |
| Iron | | balance |

The bar stock of this composition in annealed condition had a Rockwell hardness of B–94.

Figure 2:
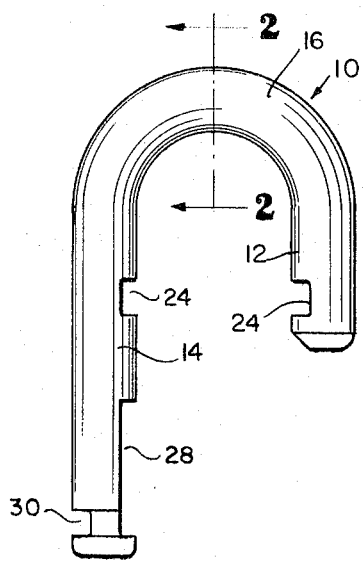
FIG. 2 shows a formed and machined shackle.

Bar stock of the foregoing composition was obtained from the manufacturer in annealed condition. It had been hot rolled to oversized dimension, and the hot rolling in air produced an oxidation and loss of carbon from the composition at the surface of the stock. Normally, such oversized bars are machined or ground to size, to remove the decarburized layer at the surface. For present purposes, that decarburized layer was not removed, but the hot rolled and oxidized stock was cold rolled to the desired size of ⅜ inch diameter, and delivered by the manufacturer in cold rolled condition. The cold rolling removed the scale but left the decarburized surface layer on the stock. For fabrication of shackles in accordance with the present invention, the bar stock was cut to length, bent to shape as shown in FIG. 2, and then broached and machined to cut the notch 26 on the toe 12 and the notches 26 and 38 and the groove 30 in the heel leg 14. The formed and machined shackles were then deburred by tumbling, and were then turned over to the heat treater for stress relief. The stress relief treatment consisted of heating to 1,000° F. for a short period and then cooling in air.

The stress-relieved, machined shackle units were then gauged and re-bent as necessary to bring the legs 12 and 14 to a slightly divergent relation coplanar with the locking portion 16 in preparation for hardening treatment which commonly draws the legs toward each other. The gauged shackle units were then delivered for heat treatment hardening. This was carried out under oxidizing and decarburizing conditions and such conditions were continued for a period longer than required for hardening, in order to produce additional decarburizing at all surfaces of the shackles and to a depth of approximately 0.015 inch over the locking portion 16 which is exposed when the shackle is in use and locked.

The hardening heat treatment was in accordance with conventional practice for hardening A–2 tool steel in the sizes present, except that the heating was carried out under decarburizing conditions and the heating was continued longer than usual. In one example, shackles of ⅜ inch diameter were heated to 1,775° F. for 30 minutes and then cooled in air. Longer periods of heating produce greater decarburization. Following the hardening, the units were double tempered at 900° F.

The composition and heat treatment were designed to give a Rockwell hardness in the range of from C–55 to C–57 at a depth of not more than 0.035 inch below the surface of the bar stock. While some variation from this specification is permissible, especially variation upward, this hardness range gives the desired resistance to hack saw cutting and to cutting with a bolt cutter. The heat treated and tempered shackles are commonly chromium plated in accordance with conventional practice, but such plating is primarily for decorative, rust-preventive, and wear-resistant purposes and is not relied on to improve the security qualities of the shackle.

Figure 3:
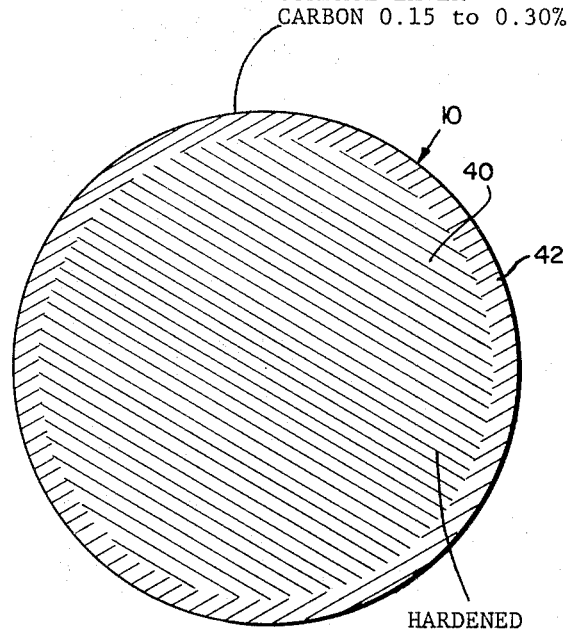
FIG. 3 is a diagrammatic cross sectional view of the finished shackle indicating the decarburized surface layer.

Analysis of the completed shackles, before plating, showed that in cross section the locking portions of the shackle was as indicated in FIG. 3. It consisted of an inner core 40 of a composition corresponding to the ladle analysis given in the foregoing table and having a relatively high carbon content and corresponding high hardness with a hardness uniformity commonly found in bar stock, and a surface layer 42 of similar composition but with relatively low carbon and reduced hardness at the surface and with progressively increasing carbon content and hardness from the surface inward. Carbon content analysis of a test bar at various depths showed a high degree of decarburization to a depth of 0.013 inch and partial decarburization to a depth of 0.017 inch. Hardness tests at various depths showed the following results:

| Depth | Rc Hardness | Depth | Rc Hardness |
|---|---|---|---|
| .0015 | 46 | .019 | 57 |
| .003 | 50 | .025 | 57 |
| .005 | 53 | .031 | 57 |
| .007 | 53 | .035 | 57 |
| .009 | 53 | .045 | 57 |
| .011 | 55 | .050 | 57 |
| .013 | 51 | .055 | 58 |
| .015 | 55 | .060 | 58 |
| .017 | 55 | Center | 58 |

Cutting tests were made on completed shackles hardened as described above. When it was attempted to cut the shackle with a hack saw, the hack saw readily cut through the outer surface layer 42 but cutting stopped once the hack saw had cut through that outer surface and had come to the hardened interior. When bolt cutters were applied, the cutter blades made notches in the relatively soft outer surface 42, but were stopped by the hard inner core 40.

Prior to the present invention, shackles had been manufactured for the same model padlock for more than a year, using the same A–2 tool steel composition manufactured in substantially the same way as described above, except that the stock had its oxidized and decarburized outer layer removed by grinding in accordance with standard practice, and no substantial decarburization was allowed to occur during manufacture and heat treatment. The resulting shackles had a substantially uniform hardness throughout, and a surface hardness of about Rockwell C–54–56. With these prior shackles severe scrap loss regularly occurred in the final step of adjusting the legs 12 and 14 of the hardened shackle to fit the holes 18 and 20 of the padlock core 22. In such adjusting, the legs were pried apart with a lever or bent toward each other with a hammer. Such treatment caused many shackles to shatter or break in two. The scrap loss from this shattering was commonly as high as 30 percent of the shackles produced, and with some lots, as high as 60 percent. With shackles made as described above, including the decarburization of the higher carbon steel, scrap loss from shattering in that final step has been substantially eliminated, and is routinely less than 1 to 2 percent.

I claim:

1. A padlock shackle or the like locking bar resistant to cutting and shattering, comprising a bar member composed on the inside of a hardened steel composition of relatively high carbon content in excess of about 0.8% and correspondingly high hardness, and having at its surface a decarburized layer of relatively low carbon content and reduced hardness, forming a relatively soft and ductile casing about the hardened steel interior, said bar having a Rockwell hardness at a level of about 0.035 inch inward from the surface in excess of Rockwell C–55, and a Rockwell hardness at the surface less than C–47.

2. A locking bar as in claim 1 in which said steel composition is an air-hardening steel.

3. A locking bar as in claim 2 in which said steel composition is A–2 tool steel having as its principal alloying elements approximately 1.0 percent carbon, approximately 5.0 percent chromium, and approximately 1.0 percent molybdenum.

4. A padlock shackle consisting of bar stock bent to a U-shaped configuration and consisting of a curved locking portion and legs for securing the same to a case, said locking portion being composed on the inside of a hardened steel composition having a carbon content in excess of 0.8 percent and a corresponding high hardness, and having a surface portion over substantially the entire surface of the locking portion at which the steel is decarburized to a relatively reduced carbon content and has lower hardness, said locking portion having a Rockwell hardness at a level of about 0.035 inch inward from the surface in excess of Rockwell C–55, and a Rockwell hardness at the surface less than C–47.

5. The process of making a shatter resistant padlock shackle or like locking bar, which comprises fabricating the bar of hardenable steel stock of a composition in which the hardness after heat treatment depends on the carbon content and which contains a relatively high carbon content in excess of about 0.8 percent to give high finished hardness upon heat treatment, subjecting the steel stock at any time during manufacture to decarburizing conditions to produce in the composition at the surface of the bar a relatively low carbon content below 0.5% which will give relatively reduced hardness in the heattreated stock, and subjecting the fabricated bar to heat treatment which developes high hardness in excess of Rockwell C–55, at a level of about 0.035 inch inward from the surface of the bar and in the interior of the bar and which produces in the decarburized surface portion of the bar relatively lower hardness less than Rockwell C–47 and greater ductility.

6. The process as in claim 5 in which the decarburizing conditions are at least in part applied to the bar stock during the heating steps of the hardening heat treatment.

7. The process as in claim 5 in which said heat treatment consists of heating and quenching steps and the heating step is conducted under conditions which produce decarburization of the surface portion of the locking bar.

* * * * *